S. DAVIDSON.
PROCESS FOR MAKING GASOLENE.
APPLICATION FILED APR. 19, 1916.

1,238,644.

Patented Aug. 28, 1917.
4 SHEETS—SHEET 1.

WITNESSES:
Walter H. Kelley
Mahalah M. Patterson

INVENTOR
Samuel Davidson
By J. Wm. Ellis
ATTORNEY.

S. DAVIDSON.
PROCESS FOR MAKING GASOLENE.
APPLICATION FILED APR. 19, 1916.
1,238,644.
Patented Aug. 28, 1917.
4 SHEETS—SHEET 2.
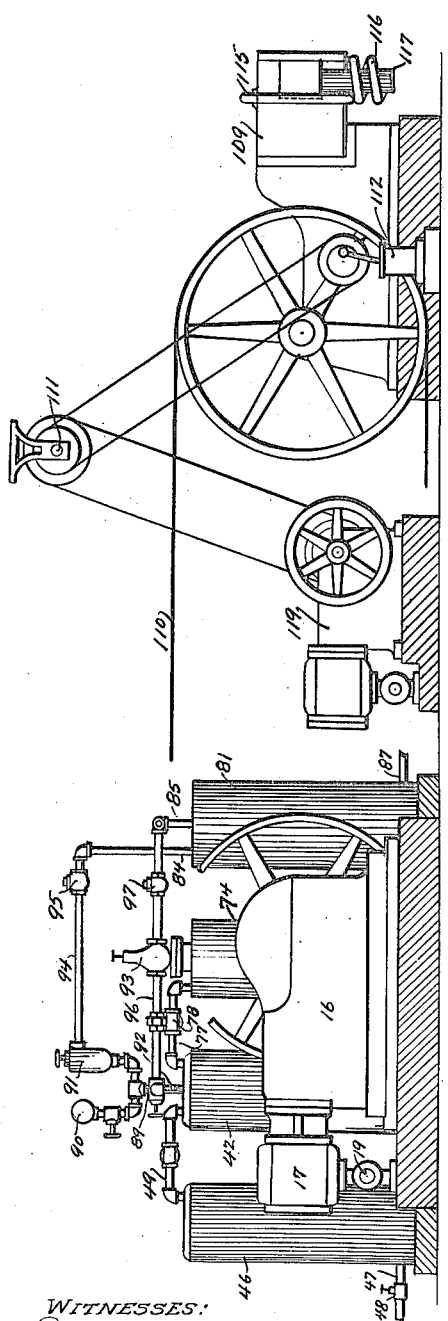
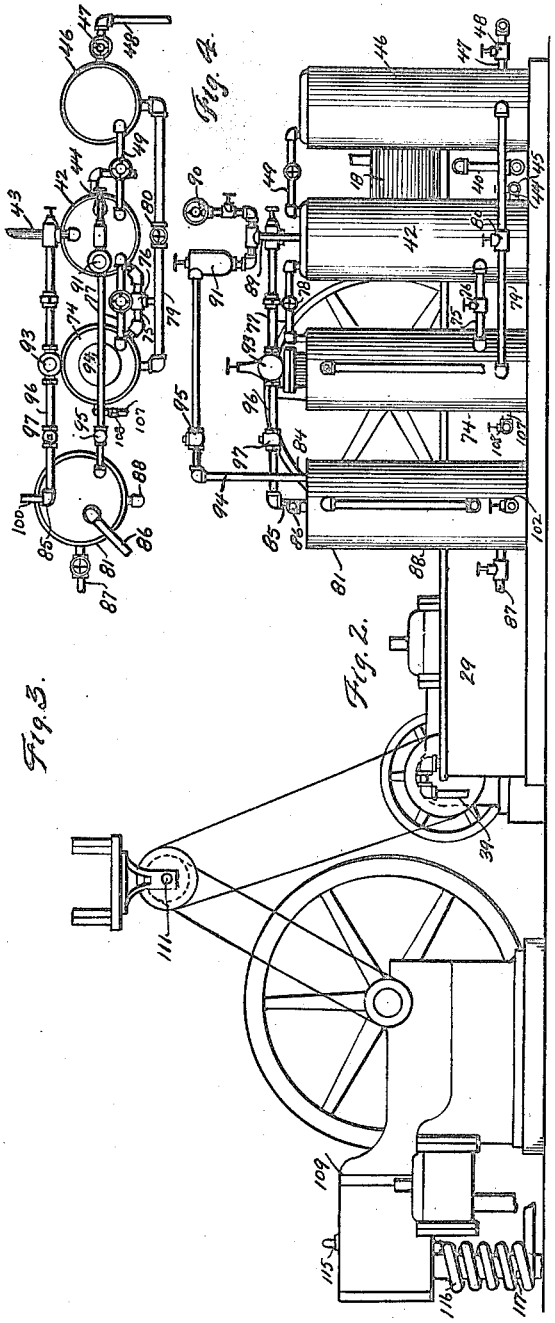
WITNESSES:
INVENTOR
Samuel Davidson
BY
ATTORNEY

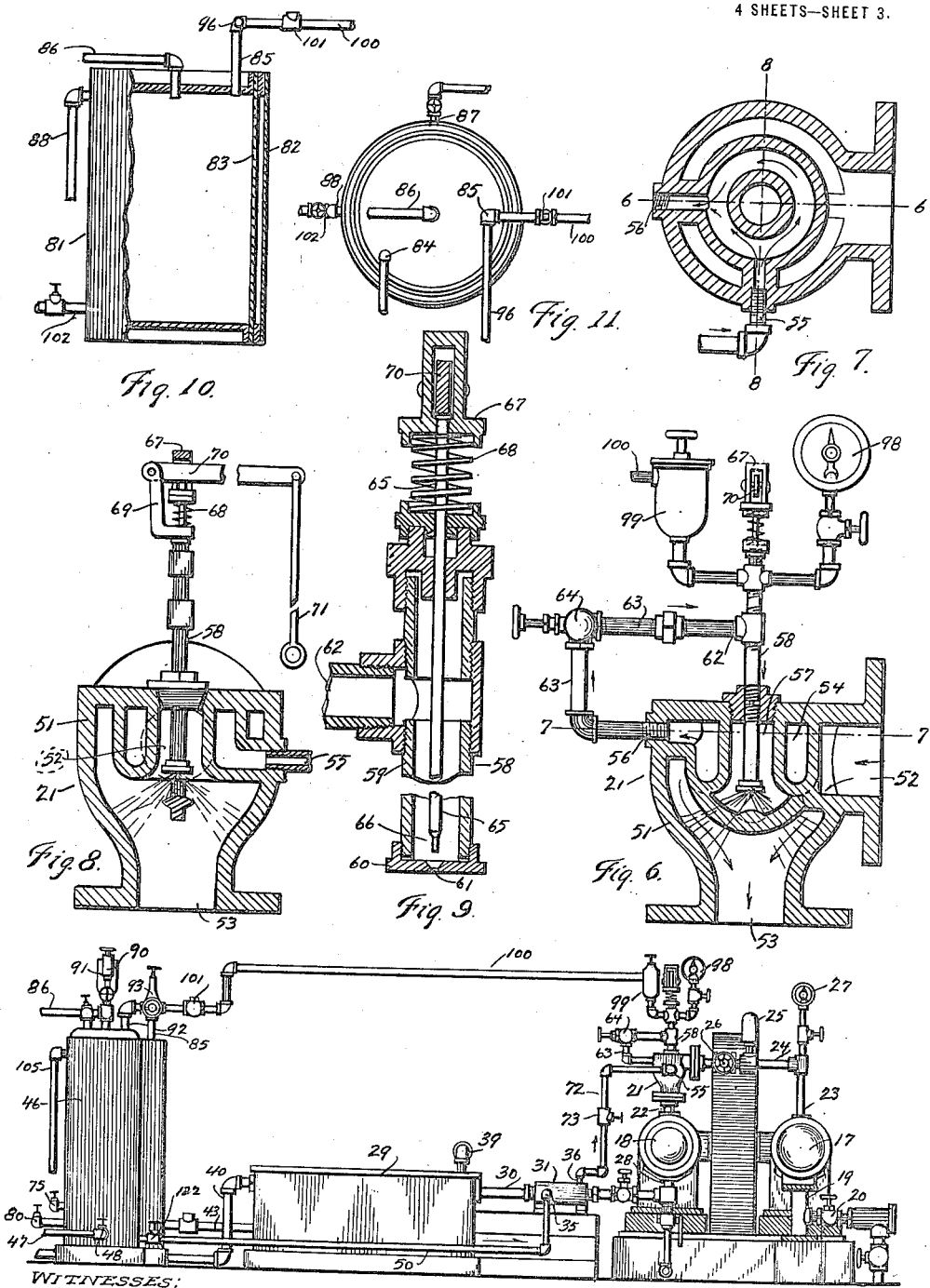

UNITED STATES PATENT OFFICE.

SAMUEL DAVIDSON, OF BUFFALO, NEW YORK.

PROCESS FOR MAKING GASOLENE.

1,238,644.  Specification of Letters Patent.  Patented Aug. 28, 1917.

Application filed April 19, 1916. Serial No. 92,300.

*To all whom it may concern:*

Be it known that I, SAMUEL DAVIDSON, a citizen of the United States of America, and a resident of the city of Buffalo, county of Erie, and State of New York, have invented certain new and useful Improvements in Processes for Making Gasolene, of which the following is a full, clear, and exact description.

My invention relates generally to a process for making gasolene, and more particularly to that method wherein naphtha, kerosene or other volatile fluid of a low specific gravity is used with natural gas.

It is well known to those skilled in the art that when using fluids of the lower specific gravities it has been impossible to properly commingle them with the gas, and if the product produced by such a process, were too high in specific gravity, it was difficult and almost impossible to get it to blend with the fluid of lower specific gravity in order that the predetermined specific gravity might be attained.

My process comprises certain methods whereby the objections above noted have been entirely overcome, and by which the mixture and union of the fluid and gas is produced under ideal conditions, and by which the standard specific gravity of the finished product may be easily maintained.

Furthermore, by means of my process there is an interchange of heat so that separate heating means are unnecessary. All of the heat necessary for carrying out my process is so used that, with ordinary care, explosion is impossible. Moreover the high hydro-carbon gas vapors which come from the relief valves and which are ordinarily piped to the outside air and therefore wasted, are in my process, conducted to suitable storage means and are piped thence to the gas engines used to operate the plant. The accumulated high hydro-carbon gases which are not used for the engines are piped to the natural gas supply pipe and are reused in carrying out the process in connection with the natural gas, or they may be conveyed to the condenser and passed therethrough. Thus, my process provides a very economical and safe method for the manufacture of gasolene.

In the accompanying drawings, forming a part of this application, I have shown one form of apparatus for carrying out my process, it being obvious that other forms than those shown may be used with equal efficiency.

In the drawings:

Fig. 2 is a side elevation thereof, as viewed from the left hand side of Fig. 1.

Fig. 3 is a side elevation of the apparatus, as viewed from the right hand side of Fig. 1.

Fig. 4 is a fragmentary, plan view of the apparatus.

Fig. 5 is an end elevation of the apparatus shown in Fig. 1.

Fig. 6 is an enlarged, sectional view of the mixer taken on line 6—6 of Fig. 7, and shows the naphtha spray needle valve and connections thereto.

Fig. 7 is a sectional, plan view of the mixer, taken on line 7—7 of Fig. 6.

Fig. 8 is a sectional view of the mixer taken on line 8—8 of Fig. 7 and shows the naphtha spray valve cleaning means.

Fig. 9 is an enlarged, sectional view of the naphtha spray valve taken on the center line of Fig. 8.

Fig. 10 is an enlarged, fragmentary, sectional elevation of the jacketed high hydrocarbon tank.

Fig. 11 is a plan view of the tank shown in Fig. 10.

Figure 1:
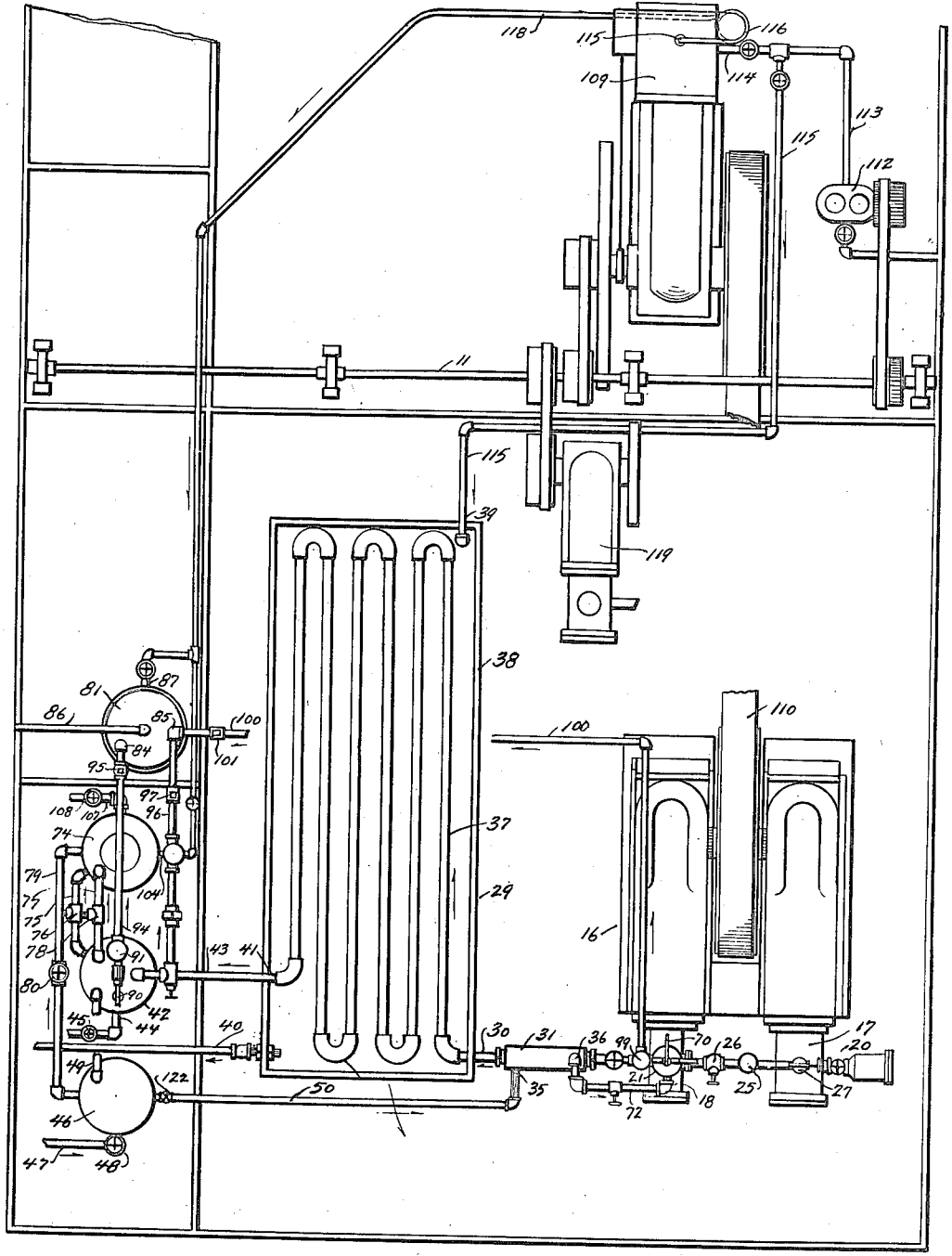
Figure 1 is a plan view, showing a complete form of apparatus for carrying out my process.
Figure 13:
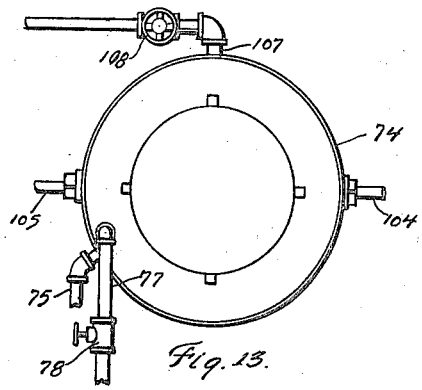
Fig. 13 is a plan view of said tank.
Figure 15:
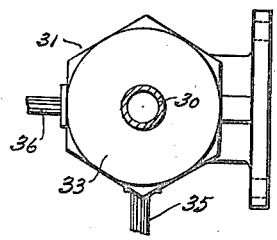
Fig. 15 is an end view of said heater.
Figure 14:
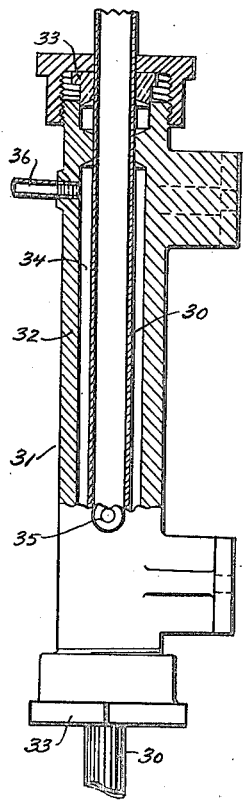
Fig. 14 is an enlarged, vertical fragmentary, sectional view of the heater used in carrying out my process.

My device comprises, in general, a two stage air compressor 16, having a low pressure cylinder 17 and a high pressure cylinder 18. 19 is the inlet for the low pressure cylinder 17 and it is connected with the natural gas supply valve 20. 21 is the mixer to be hereinafter described. This mixer is connected at its bottom to the inlet 22 of the high pressure cylinder 18. This mixer is also connected with the exhaust pipe 23 of the low pressure cylinder 17 by means of piping 24. In the pipe 24 is preferably arranged an air chamber 25 and a valve 26. Immediately above the exhaust pipe 23 is provided a gage 27. The exhaust 28 of the high pressure cylinder 18 is connected with the condenser 29 by means of a pipe 30 passing through the heater 31. This heater, shown enlarged in Figs. 14 and 15, comprises a hollow body 32, through which is passed the pipe 30 connecting with the condenser and exhaust of the high pressure cylinder of the compressor. A suitable stuffing box 33 is arranged at each end of the body so as to prevent leakage of the fluid passing through the space 34 within the body. This space is provided with a suitable inlet 35 and outlet 36 to be described hereinafter.

The condenser 29 is provided with one or more coils 37 arranged within a tank 38. This tank has a cold water inlet 39 and a water drain pipe 40. The outlet 41 of the condenser is connected to the gasolene tank 42 by means of the pipe 43. The gasolene tank 42 is provided near its bottom with a gasolene outlet 44, which is provided with a valve 45 and connected by means of suitable piping to the gasolene storage tank, (not shown), whence the gasolene may be conducted to tank cars.

46 is a naphtha tank which contains the naphtha, kerosene or other volatile fluid of low specific gravity, which is to be used in my process. This tank is provided with an inlet 47 controlled by the valve 48, and it is connected at its top with the gasolene tank 42 by means of a valved by-pass 49. The gasolene coming from the condenser is under a high pressure and with the by-pass 49 open, this pressure will be exerted upon the volatile fluid contained in the naphtha tank and will force it through the pipe 50 connecting it with the inlet 35 of the heater 31. A valve 122 is located in the pipe 50 near the naphtha tank 46. The mixture coming from the high pressure cylinder 18 of the compressor is highly heated and as it is conducted through the pipe 30, passing through the heater 31, it gives off a portion of this heat to the incoming naphtha in the heater.

Referring now more particularly to Figs. 6 to 8, where I show enlarged views of the mixer 21, 51 is the body of the mixer, which is provided with a compressed gas inlet 52 and a mixture outlet 53, which connects with the inlet 22 of the high pressure cylinder of the compressor. An annular chamber 54 is provided in the upper portion of this mixer, which chamber is arranged with a naphtha inlet 55 and a naphtha outlet 56. The naphtha entering this chamber is again heated by the compressed gases from the low pressure cylinder 17 of the compressor, which are forced around the outside of the chamber 54. The mixer is provided with a central aperture 57 within which is arranged the naphtha spray valve 58 (see Fig. 9). This valve is provided with a body 59, which extends down within the opening 57 and is provided at its lower end with a valve plate 60, having an opening 61. The valve is provided with an inlet 62, which is connected by means of the piping 63 and valve 64 to the naphtha inlet 56 of the mixer. Arranged centrally through the naphtha spray valve is a cleaner stem 65. This stem is provided with a point 66, and at its lower end it is engageable with the aperture 61 when it is moved downwardly. At the upper end of the stem is arranged a guide cap 67, and between this guide cap and the body of the valve is arranged a helical spring 68, which surrounds the stem 65 and serves to keep it in its normally uppermost position. An arm 69 is carried by the body of the valve and has pivoted at its upper end a lever 70. This lever passes through the guide cap 67 and has a pull rod 71 at its outer end. By pulling down upon the rod 71, the point 66 of the stem is passed through the aperture 61 in the plate 60 of the valve, thus serving to remove therefrom any collection of foreign substance. The inlet 55 of the mixer is connected with the outlet 36 of the heater 31 by means of the pipe 72 and valve 73.

74 is a blending tank, which is arranged preferably adjacent to the gasolene tank 42 and is connected with said tank near its bottom by means of the by-pass 75, having a valve 76. A by-pass 77, having a valve 78, also connects these tanks at their tops. By this last mentioned by-pass, the pressure in the gasolene tank may be conducted to the top of the fluid in the blending tank and force the same therefrom. A by-pass 79 having a valve 80 also connects this blending tank with the naphtha tank 46, whereby the volatile fluid of low specific gravity, contained in said tank, may be drawn over into the blending tank.

Figure 12:
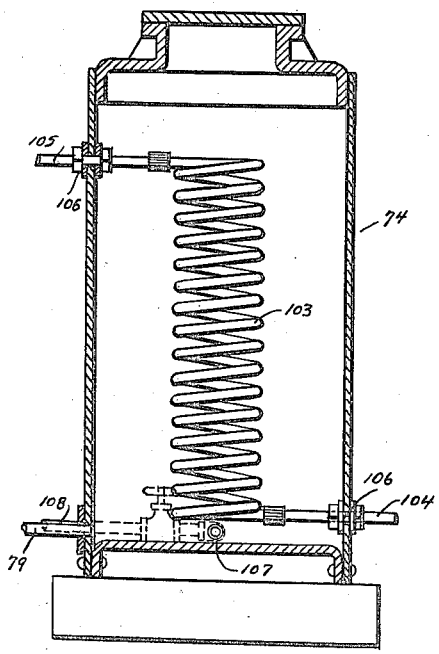
Fig. 12 is an enlarged, sectional elevation of the blending tank.

When gasolene is drawn from the gasolene tank 42, it is very cold and not in the proper condition for blending and therefore must be raised in temperature. To accomplish this, I provide the blending tank 74 (shown enlarged in Fig. 12) with a central heater coil 103, the inlet 104 and outlet 105 of which pass through stuffing boxes 106. This tank is also provided with a fluid drain 107, having a valve 108, through which the gasolene is drawn from the tank and is thence conveyed to the gasolene storage tank (not shown).

81 is a high hydro-carbon vapor tank to which is conducted all the waste gases from the gasolene tank and safety valves used in my apparatus. As the vapors, which are received in this tank, are very cold, it is necessary to provide some suitable means of heating the same. This is accomplished by providing the tank with a water jacket 82, surrounding the casing 83 of the tank. This tank is provided in its top with two vapor inlets 84 and 85, and with a vapor outlet 86. The vapor outlet 86 is connected with a suitable gasometer (not shown) from which the accumulated gases are drawn to supply the gas engines used in the plant. The tank is provided with a drain 102 from which the heavy vapors, carrying naphtha or semi-solids, collecting in the bottom of the tank, are conducted back through the entire system with the natural gas. This tank is provided with a hot water inlet 87 and a water outlet 88.

During the process there is a constant accumulation of the high hydro-carbon gas vapors in the top of the gasolene tank 42, which is usually allowed to go to waste in the atmosphere. In my process, however, I utilize these vapors and still maintain a pressure within the gasolene tank. To accomplish this, I connect the pressure pipe 92, extending from the top of the gasolene tank, with the vapor inlet 85 of the vapor tank 81 by means of piping 96. In the piping 96 is located a regulator valve 93 and a check valve 97. The regulator valve is adjusted so that the pressure within the gasolene tank 42 will be maintained at a predetermined point and still permit all gases above the amount, which produces the predetermined pressure, to pass into the vapor tank 81. The check valve 97 prevents the return of these gases through the pipe 96. To take care of a very sudden rise of pressure within the gasolene tank 42, I provide an auxiliary pressure pipe 89, at the upper end of which is connected a pop safety valve 91. The exhaust from this safety valve is connected with the inlet 84 of the tank 81 by means of the pipe 94 in which is placed a check valve 95. The pressure pipe 89 also has connected with it a pressure gage 90, which indicates the pressure within the gasolene tank 42.

The mixer 21 is also provided with a gage 98 and a pop safety valve 99. The exhaust from the pop safety valve 99 is connected with the inlet 85 of the high hydro-carbon vapor tank 81 by means of a pipe 100, in which is connected a check valve 101.

109 is a gas engine furnishing power for operating the compressor 16 and other parts of my apparatus. It is directly connected to the compressor by means of the belt 110, and is also suitably connected with a line shaft 111. 112 is a water pump which supplies water, under pressure, to the gas engine 109, condenser 29, the coil 103 of the blending tank 74, and the jacket surrounding the high hydro-carbon vapor tank 81. The outlet 113 of the pump 112 is connected with the gas engine by means of the pipe 114 for the purpose of cooling the said gas engine. This outlet is also connected by means of a pipe 115 to the cold water inlet 39 of the condenser for supplying a cooling medium to said condenser. After the water has passed through the cylinder jacket of the gas engine, it is heated and the outlet 115 from the jacket of the gas engine is connected with a helical pipe coil 116, which is wrapped about the exhaust pipe 117 of the engine whereby the water passing therethrough is highly heated. This hot water is now conducted by means of piping 118, which connects with the lower end of the pipe coil 116, to the inlet 87 and the jacket of the vapor tank 81. After passing through the jacket, the water is drained through the outlet 88 and is conducted to any suitable place. The piping 118 also carries hot water to the inlet 104 of the coil 103 contained in the blending tank 74. After the water has passed through this coil, it is also drained from the outlet 105 and conducted to any suitable place.

The gas engine 109, the auxiliary air compressor 119, and the water pump 112 are each connected with the line shaft 111 by means of clutches or tight and loose pulleys, so that they may be connected or disconnected with said line shaft at will.

When my process is to be carried out by the apparatus shown and described, the naphtha tank 46 is filled with volatile fluid of a low specific gravity, either naphtha or kerosene, or a combination of both. The compressor 16 is now started and after the gas supply valve 20 has been opened, natural gas will be drawn into the low pressure cylinder 17 and forced through the pipe 24 and the mixer 21 where it will give off some of its heat to the mixer. The gas is allowed to pass through the high pressure cylinder 18 of the compressor, and when it is forced from the exhaust 28 thereof and passed through the pipe 30, it has been raised to a high temperature and will heat the heater 31. When the valve 122, in the pipe 50 near the naphtha tank, is open, the volatile fluid of low specific gravity will flow through this pipe and through the heater 31 by gravity. With the valve 73 in the pipe 72 open, this fluid will flow through said pipe and into the chamber 54 of the mixer. The fluid flowing through the heater 31 will be raised in temperature and in passing through the chamber 54 of the mixer 21, it is again heated. From this chamber the fluid is conducted by means of the piping 63 through the valve 64 and is forced into the body of the naphtha spray valve 58 and through the aperture 61 in the lower plate thereof. This aperture is so formed that the fluid is spread to substantially cover the outlet 53 and thus thoroughly commingle with the natural gas passing through said opening. This mixture of gas and naphtha is now drawn into the high pressure cylinder 18 of the compressor where it is compressed, raised in temperature and forced out through the pipe 30, passing through the heater 31, thus giving off a great deal of latent heat to the heater, which is taken up by the naphtha passing reversely therethrough. This highly compressed and highly heated mixture of naphtha and natural gas is now passed through the cooling coil 37 of the condenser 29, where its temperature is reduced and whence it is passed into the gasolene tank 42 under high pressure. If the specific gravity of the gasolene, as it comes to the tank 42, is at the desired point, it can be drawn thence through the drain 44 and valve 45 and carried immediately to the gasolene storage tank. In carrying out my process there will be considerable high hydro-carbon gas vapors which will come from the condenser with the gasolene. These, of course, will be contained in the top of the gasolene tank. As the specific gravity of these vapors is extremely high, the gasolene contained in the tank will be somewhat blended by them, i. e. its specific gravity raised. When the pressure of these gases within the gasolene tank exceeds a predetermined point, they will pass off through the piping 96, regulator valve 93 and check valve 97 and be conducted to the high hydro-carbon gas vapor tank 81. In case the increase in pressure is too sudden for the regulating valve 93 to take care of, the pop safety valve 91 will quickly operate to relieve the pressure and conduct the exhaust gases through the piping 94, check valve 95 and then to the tank 81.

As hereinbefore stated, when the naphtha tank 46 is filled, the naphtha will be carried through the system to the mixer by means of gravity, but just as soon as the process is started and the pressure within the gasolene tank 42 has reached a predetermined point, the valve in the by-pass 49 is opened and the high hydro-carbon gas vapors, under pressure, will pass into the naphtha tank 46 on top of the naphtha contained therein and the naphtha will then be fed through the system by the regulated pressure contained in the gasolene tank.

If the specific gravity of any batch of gasolene contained within the tank 42 is above a desired point, the valve 76 in the by-pass 75 is opened and the gasolene is carried from the gasolene tank 42 over to the blending tank 74. Some of the volatile fluid of low specific gravity in the naphtha tank 46 is also carried to the blending tank 74 through the by-pass 79 by opening the valve 80. The amount of naphtha taken from the tank 46 and mixed with the gasolene coming from the tank 42 depends upon the specific gravity of the gasolene, only enough being added to reduce the specific gravity to a predetermined point. The gasolene as it comes from the condenser and enters the gasolene tank 42, is very low in temperature, so that it is necessary to heat the mixture contained in the blending tank 74 to a point where proper blending and admixture is possible. When the gasolene in the blending tank 74 has been lowered to a desired specific gravity, the valves 80 and 76 having been closed, the gasolene may be drained from the blending tank through the pipe 107 and valve 108 and then conducted to the gasolene storage tank.

If, for any reason, the pressure of the natural gas and naphtha within the mixer 21 reaches and exceeds a predetermined point, the pop safety valve 99 will operate and the exhaust gases will be carried through the pipe 100, check valve 101 and discharged into the high hydro-carbon vapor tank 81. All of the high hydro-carbon gas vapors which are collected in the tank 81 are utilized for operating the gas engine 109 which is suitably connected with the outlet 86 of this tank in a well known manner or may be used in any other desired way. The heavy vapors carrying naphtha or the semi-solids which collect in the bottom of the tank 81 are conveyed through the drain 102 to the natural gas supply pipe and are there taken in through the valve 20 and mixed with the natural gas. The vapors coming from the tank will be very low in temperature, and they are heated by the jacket surrounding the vapor tank 81 before they are carried off for use.

The water for heating the high hydro-carbon tank and the coil in the blending tank is heated by the cylinder of the gas engine and by the coil wrapped about the exhaust pipe of said engine so that no separate water heating means is necessary.

It will be clear from the foregoing description that I have produced a process for making gasolene which is very safe by reason of the safety devices employed in carrying it out, and because of the fact that all the waste high hydro-carbon gas vapors are conducted to an inclosed tank. Furthermore, my process is very economical, because the high hydro-carbon gas vapors are not wasted, but are reused in the process and are also utilized for the gas engines furnishing power for the plant. Great economy is also derived because of the interchange of heat: First, between the highly heated compressed mixture coming from the high pressure side of the compressor and the volatile fluid of low specific gravity before it reaches the mixer, and the further interchange between the heated mixture and the volatile fluid before the mixture is compressed within the high pressure cylinder of the compressor. Second, between the heat given off by the cylinder of the gas engine and the exhaust pipe thereof, and the water used for heating the blending and high hydro-carbon vapor tanks. Further economy and safety in my process is derived from the fact that none of the gases, volatile fluid of low specific gravity, or gasolene are handled by means of pumps, the pressure derived from the compressor being utilized to carry the fluid through the system.

Furthermore, no separate heating means are necessary in my process, because in the process all of the heat units produced by carrying out the same are conserved and utilized by an interchange. Moreover my process makes it possible to produce a greater increased quantity of gasolene from the raw materials used than has heretofore been possible by means of the old methods of the art.

Throughout the foregoing description, I have used the general term naphtha, for convenience, it being obvious that this term applies equally to kerosene or other volatile fluid of low specific gravity or to a mixture of two such fluids.

What I claim is:

1. A process for making gasolene comprising, the compression of natural gas, then mixing the compressed gas with a volatile liquid of low specific gravity, then subjecting the mixture to high compression, and then condensing such highly compressed mixture.

2. A process for making gasolene comprising, the compression of natural gas, then leading such compressed gas to a mixer, then forcing a volatile liquid of low specific gravity under pressure to the mixer and mixing it with the compressed gas, such pressure being derived from the initial compression of the mixture, then highly compressing the mixture and then condensing the same.

3. A process for making gasolene comprising, the compression of natural gas, then leading such compressed gas to a mixer, then heating a volatile liquid of low specific gravity by the heat of compression of the mixture, then leading the liquid to the mixer and mixing it with the compressed gas, then highly compressing the mixture, and then condensing the same.

4. A process for making gasolene comprising, the compression of natural gas, then leading a volatile liquid of low specific gravity under pressure to a mixer, then subjecting the liquid to the heat of the compressed gas, then mixing it with the compressed gas, then highly compressing such mixture, and then condensing the same.

5. A process for making gasolene comprising, the compression of natural gas, then leading such compressed gas to a mixer, then heating a volatile liquid of low specific gravity by the heat of compression, then leading the liquid to the mixer, then subjecting the liquid to the heat of the compressed gas, then mixing it with the compressed gas, then highly compressing such mixture, and then condensing the same.

6. A process for making gasolene comprising, the compression of natural gas, then leading such compressed gas to a mixer, then leading a volatile liquid of low specific gravity under pressure to such mixer and mixing it with the compressed gas, then highly compressing the mixture, then condensing the same, then leading the condensed product to a closed receptacle, and then leading the high hydro-carbon gas vapors from such receptacle to a suitable storage tank.

7. A process for making gasolene comprising, the compression of natural gas, then mixing the compressed gas with a volatile liquid of low specific gravity, then subjecting the mixture to high compression, then interchanging the heat of the high compression of the mixture with a volatile liquid of low specific gravity, and then condensing the highly compressed mixture.

8. A process for making gasolene comprising the compression of natural gas, then heating a volatile liquid of low specific gravity by the heat of such compressed gas, then spraying the heated liquid into the presence of the compressed gas, thereby mixing the compressed gas with said volatile liquid and subjecting it to high compression, and then condensing such highly compressed mixture.

9. A process for making gasolene comprising, the compression of natural gas, then leading such compressed gas to a mixer, then leading a volatile liquid of low specific gravity under pressure to such mixer and mixing it with the compressed gas, then highly compressing the mixture, then condensing the same, then leading the condensed product to a closed receptacle, then leading the high hydro-carbon gas vapors from such receptacle to a suitable storage tank, and then heating the vapors in the storage tank.

10. A process for making gasolene comprising, the compression of natural gas, then leading such compressed gas to a mixer, then leading a volatile liquid of low specific gravity under pressure to the mixer and mixing it with the compressed gas, then highly compressing such mixture, then condensing the same, then leading the condensed product to a closed receptacle, and then heating the condensed mixture and blending the same with a volatile liquid of low specific gravity to obtain the predetermined specific gravity of the final product.

11. A process for making gasolene comprising, compression of natural gas, then leading such compressed gas to a mixer, then leading a volatile liquid of low specific gravity under pressure to such mixer and mixing it with the compressed gas, then highly compressing the mixture, then condensing the same, then leading the condensed product to a closed receptacle, then regulating the pressure of the high hydrocarbon gas vapors in such receptacle, and then leading them to a suitable storage tank.

12. A process for making gasolene comprising, the compression of natural gas, then mixing the compressed gas with a volatile liquid of low specific gravity, then subjecting the mixture to high compression, then condensing such highly compressed mixture, then leading the condensed product to a closed receptacle, then regulating the pressure of the high hydro-carbon gas vapors in such receptacle, then leading them to a suitable storage tank and then mixing them with the natural gas before it is compressed, whereby the unused high hydro-carbon gases may be utilized.

In testimony whereof, I have hereunto signed my name in the presence of two subscribing witnesses.

SAMUEL DAVIDSON.

Witnesses:
J. WM. ELLIS,
WALTER H. KELLEY.